April 19, 1932.  A. E. ROBINSON ET AL  1,854,672
CHIP CONTROL DEVICE
Filed Feb. 25, 1931    4 Sheets-Sheet 3
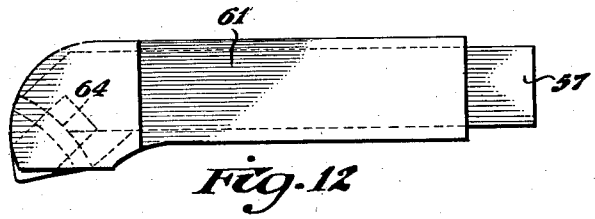
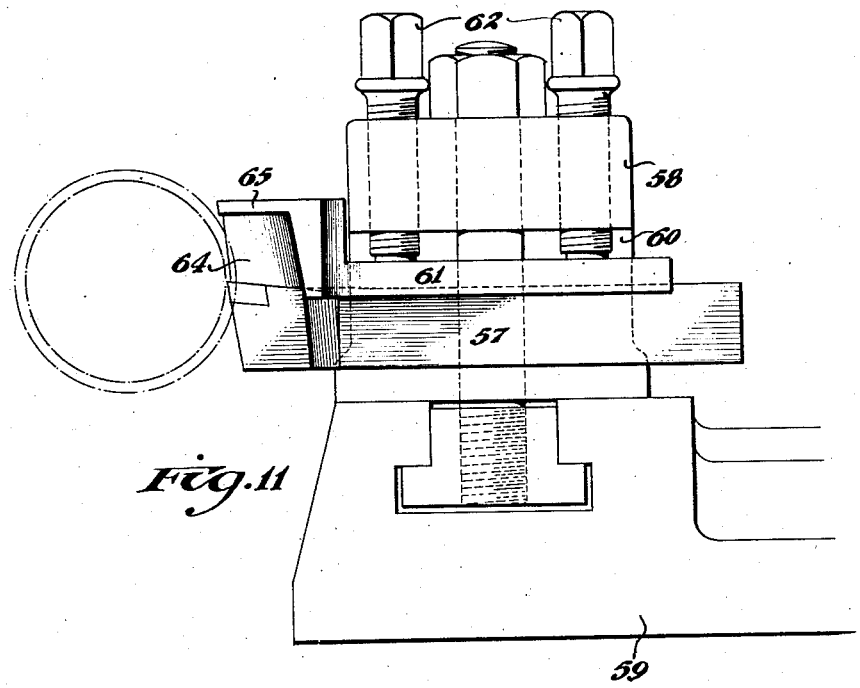
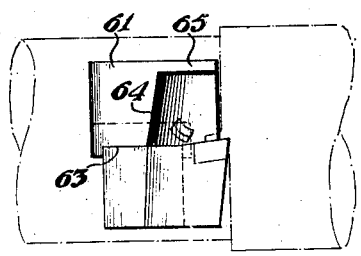
INVENTORS
Albert E. Robinson
Charles E. Black
BY
Wood & Wood  ATTORNEYS April 19, 1932.  A. E. ROBINSON ET AL  1,854,672
CHIP CONTROL DEVICE
Filed Feb. 25, 1931    4 Sheets-Sheet 4
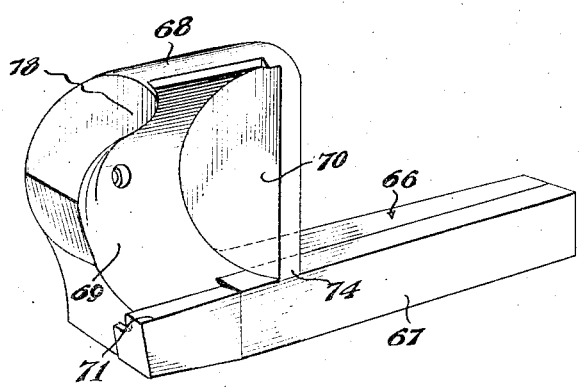
Fig.14
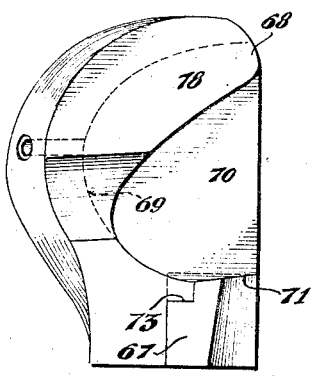
Fig.15
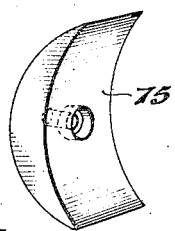
Fig.18
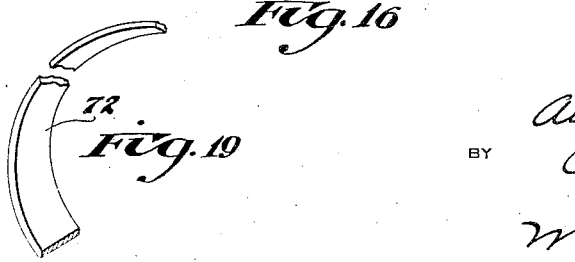
Fig.16
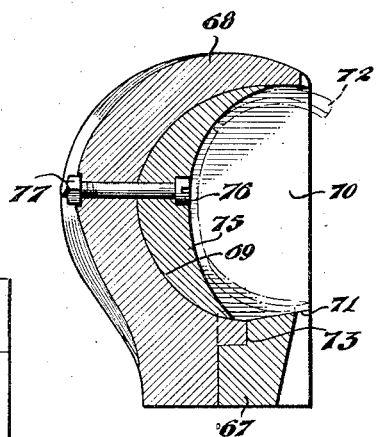
Fig.17
Fig.19
INVENTORS
Albert E. Robinson
Charles E. Black
BY
Word & Word  ATTORNEYS Patented Apr. 19, 1932

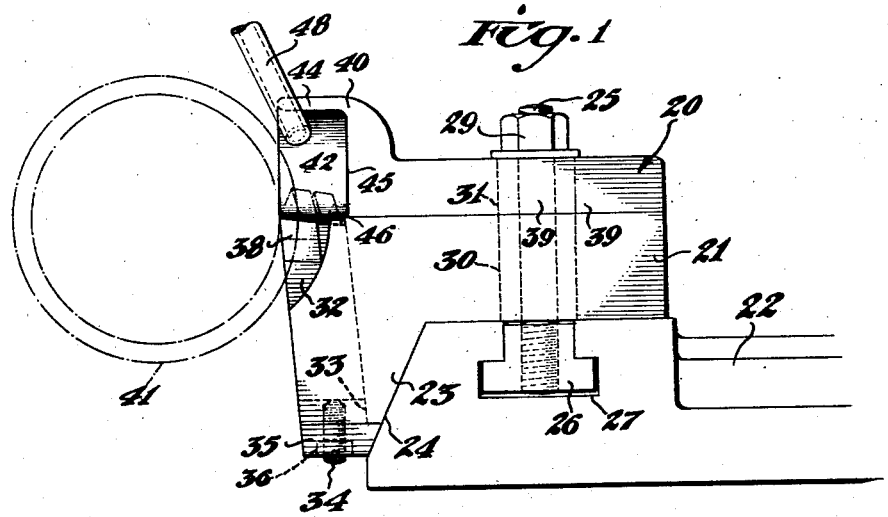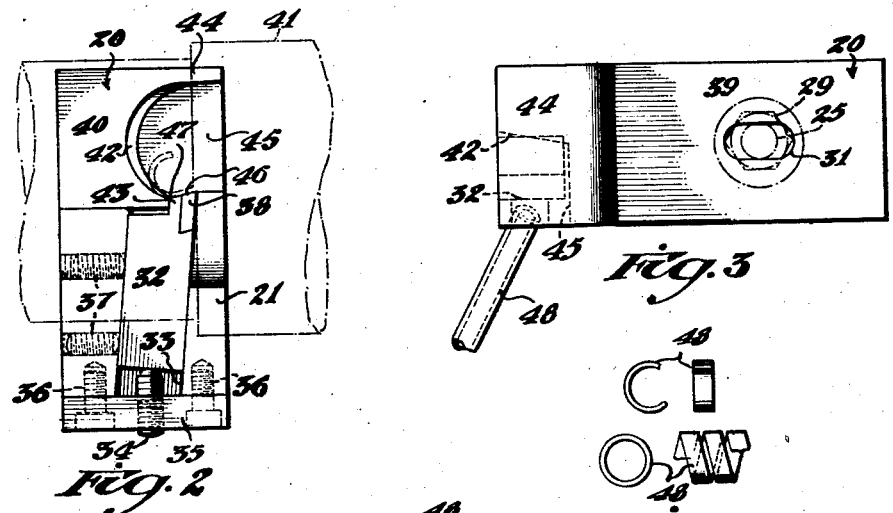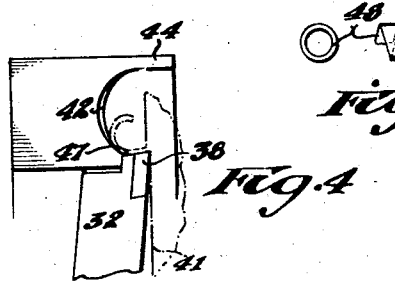

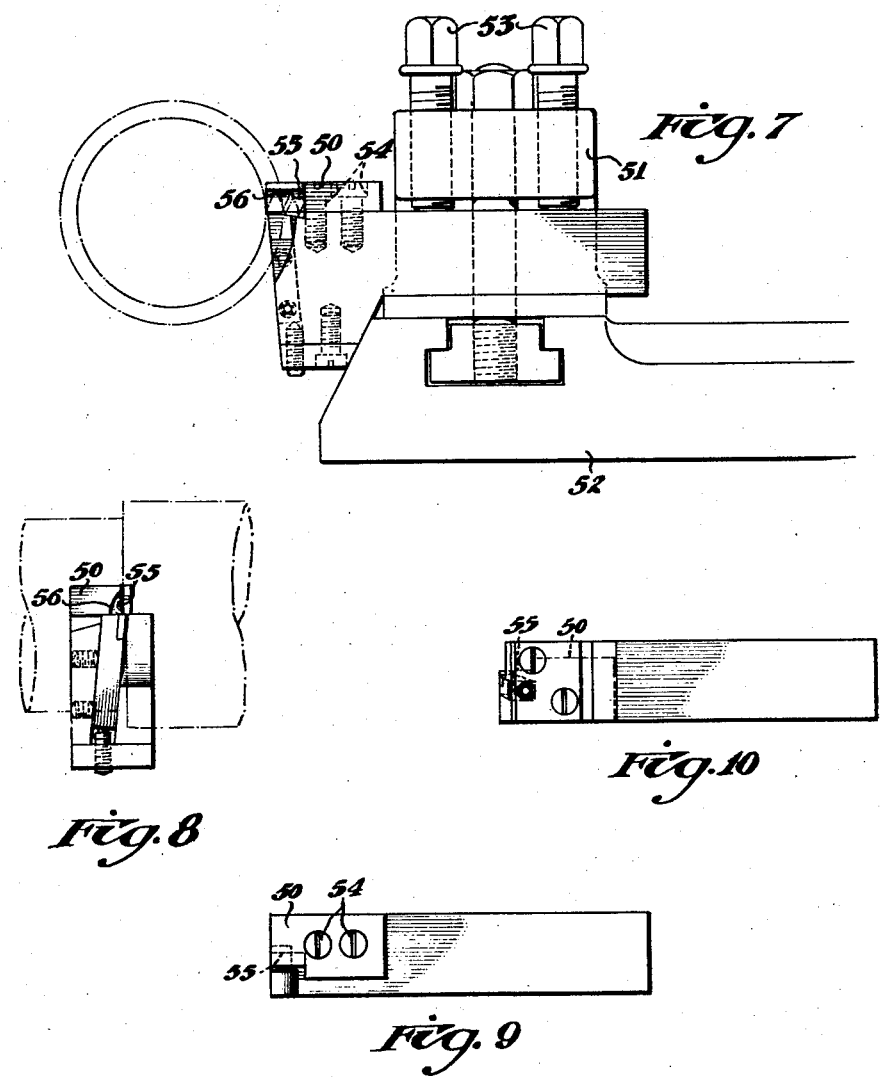

1,854,672

UNITED STATES PATENT OFFICE

ALBERT E. ROBINSON AND CHARLES E. BLACK, OF CINCINNATI, OHIO, ASSIGNORS TO THE AMERICAN TOOL WORKS, OF CINCINNATI, OHIO, A CORPORATION OF OHIO

CHIP CONTROL DEVICE

Application filed February 25, 1931. Serial No. 518,148.

This invention relates to metal cutting instrumentalities and is particularly directed to chip controlling devices adapted to be used in conjunction with cutting tools, to improvements in the holders for the tools, and to improved means for cooling the tool and chips. Primarily, the devices are designed for use with those cutting tools formed of metal having qualities of extreme hardness and durability under heat, such as tungsten carbide.

In view of the modern trend toward high speed operation of machines utilizing cutting tools, which trend has resulted due to the development and increasing use of tungsten carbide tools, the need for absolute and efficient control of the cuttings or chips coming from the work has become extremely imperative. Under existing conditions the chips come from the work in long pieces, twisting and whipping about and often becoming entangled in the moving parts of the machine and lodging upon the guideways. When this condition and action of the chips is considered, with the slower rates of machine operation, it is not a factor vitally effecting the safety of the workman and operation of the machine although the chips are awkwardly formed and very difficult to handle and remove. However, even under the average speeds the problems of chip control have been somewhat acute. It will be obvious, as the machines are operated at higher rates of speed, under the modern practice, these long chips become an extreme hazard as they have a tendency to twist and turn and to be thrown about at high speed in totally unexpected directions and because of their sharpness are a serious menace to the operators of the machines.

It is, therefore, an object of this invention to provide a chip control device which is effective for forming and breaking the chips, as they leave the tool, into suitable sizes for easier handling and removal and for eliminating the hazards above set forth. The object includes the provision of an element relative to the tool, which element receives the chips directly off the tool and prevents their reaching any velocity which would be dangerous. Furthermore, the element encases the cuttings or chips from the region of the tool as they are being formed for preventing undue movement of the same as would be induced ordinarily by the extreme speeds of operation.

It is another object of this invention to provide a device of the foregoing nature which includes features of removability, whereby the surface portions of the device contacted by the chips may be easily removed and replaced for varying the curvature of the surfaces contacted by the chips and for replacing these portions when they are worn out by long service. It is furthermore of importance that the portions mentioned, since they are removable, can be formed of very hard metal and the main body of the chip control device may be formed by casting without particular regard to the surface wearing qualities of the metal.

It is another object of this invention to provide a device of this nature which directs or deflects the detached chips or cuttings after they have been broken off by the chip breaking instrumentality and projects the same from the work in a direction away from the operator and the guideways of the machine.

The same conditions which produce the hazard because of long chips and rapid movement thereof, namely the high speed operation, also produce the necessity for rapidly cooling the chips or cuttings in an improved manner over the existing forms of spray devices. It is, therefore, another object of the invention to provide a well or pocket constantly supplied and kept filled with cutting coolant in a position where the chip is substantially or partially immersed for cooling the same more readily and rapidly. It is more generally the object in the provision of this device to collect the coolant in a pool for surrounding the heated chips rather than to spread the coolant out in a thin layer over the tool and work by spraying, which method has been found defective in that it does not effect the cooling rapidly enough.

It is another object of this invention to provide an improved support for the tungsten carbide cutting tool whereby the tool is entirely supported except for the necessary working clearance at its cutting point, thereby eliminating springing of the tool which would otherwise result as in those instances where the tool extends beyond the tool holder. This improved mounting also prevents chattering of the tool and any bending thereof by providing a maximum amount of support for the tool particularly in line with the thrusts. This is of considerable importance in tools which have their cutting ends formed of tungsten carbide for the reason that tungsten carbide is apt to fracture and is quite weak to lateral or bending strains and excessive vibration. Tungsten carbide is an extremely expensive material, and for this reason is used generally in the form of a small insert at the cutting end of the tool for including the cutting tip or edge. Consequently for economical operation the tungsten carbide must be carefully protected against fracture.

Another object of this invention is to provide vertical adjustment for the cutting tool in its holder so that it may be efficiently and accurately presented to the work.

Other objects relate to the association of the chip control element and tool holder to accomplish the above objects in the most efficient and compact assembly, whereby the tool and devices of the present invention do not take up a great deal of space and whereby the relation of the chip control device and the solid support in the holder for the tool do not interfere with the efficient application of the tool to the work and whereby the mounting of the tool holder relative to the tool slide braces the same, which objects and advantages along with certain other objects and advantages will be more fully apparent from the description of the accompanying drawings, in which:

Figure 1 is a side elevation of the forward end of a tool slide carrying the improved devices of the present invention relative to the tool and showing the position of the parts relative to the work.

Figure 2 is a front view of the tool holder and the chip control element, further illustrating the parts relative to the work and illustrating the formation of a chip.

Figure 3 is a top plan view of the chip control element.

Figure 4 is a fragmentary view, taken similar to Figure 2, but showing a slightly varied contour for the chip forming surface of the chip control device.

Figures 5 and 6 are views of typical chips as formed by the present devices.

Figure 7 is a side elevation of a tool slide showing another form of a chip breaking and deflecting device for use where chips of smaller cross section may be formed as in finishing cuts or light turning operations.

Figure 8 is a front view of the tool holder and tool shown in Figure 7, the chip illustrating the chip control element functioning to curl the chip so as to form it in extremely small cross section.

Figure 9 is a top plan view of the chip control element disclosed in the two preceding views.

Figure 10 is a bottom view of the chip control element of Figure 9.

Figure 11 is a side elevation of the forward end of a tool slide showing a varied type of tool mounting and illustrating a chip control device for use in those cases where brittle substances such as cast iron or brass are being machined.

Figure 12 is a top plan view of the chip control device of Figure 11 showing the same relative to the tool.

Figure 13 is a front view of the tool and the chip control element of Figure 11 showing the same functioning.

Figure 14 is a perspective view showing another form of chip control device and illustrating the same assembled relative to the tool.

Figure 15 is a front end view of Figure 14.

Figure 16 is a top plan view of the form of chip control device shown in Figures 14 and 15 but adding interchangeable shoes for varying the contour of the chip forming surface.

Figure 17 is a sectional view taken on line 17—17, Figure 16.

Figure 18 is a perspective view of one of the interchangeable shoes.

Figure 19 is a perspective view of one of the chips as it is formed by the device of Figures 14 to 18.

The element of this invention although shown in varying forms for use with tools performing various cutting operations on various kinds of metals, possesses the same general feature in all instances shown, that is of controlling the movement of the chips. A surface is provided within the element in all instances, this surface proceeding from a point adjacent the rear edge of the cutting tip of the tool and curving to accomplish deflection or curling of the chips. The surface is formed of a curvature which is, in the instances where curling is to be accomplished, abrupt enough to break the cuttings or chips at sufficient intervals for producing relatively short chips.

The chip breaking surface in all cases is constituted by an overhanging wall enclosing the region at the tip of the tool and a rear wall is included for abutment by the chip if the chip has failed to break under the curling action and assumed a length which is considered a maximum length for safety purposes whereupon the chip is positively broken because of inability to rotate as it is formed in a spiral from the work.

Referring to Figures 1 to 4 of the drawings, the chip control element is generally indicated at 20. This element is mounted on a tool holder 21 and the tool holder is supported on a tool slide 22. The tool slide operating mechanism and the work support are not shown since the invention is entirely concerned with the chip control apparatus and its relation to the cutting tool for the various purposes set forth. The tool holder includes a head 23 at its forward end, the head having an inclined rear surface at its lower portion abutting an upwardly facing inclined surface 24 of the tool slide for the purpose of bracing the head against the downward and outward cutting thrusts.

The tool holder is attached to the slide by means of a bolt 25, the bolt having a T-head 26 thereon, which T-head is located within a T-groove or cross channel 27 of the tool slide. The bolt is drawn upwardly by means of a nut 29 and passes through a slot 30 longitudinally disposed in the tool holder whereby the tool holder may be adjusted longitudinally of the slide due to the clearance provided by the slot, or may be laterally adjusted by moving the bolt within the cross channel or T-groove. The chip control element 20 is attached to the holder and slide by means of the bolt 25, which bolt passes through a slot 31 longitudinally disposed in the shank portion of the control element for permitting adjustment of the control element relative to the cutting end of the tool.

The tool 32 is secured in the head of the holder within a slot 33 in the forward face of the head. The slot 33 is slightly inclined (see Figure 2) to dispose the tool at an angle so as to clear the tool relative to the work below the cutting edge. The tool is enclosed at its back and sides, and is vertically adjusted in the slot or channel 33 by means of an adjustment screw 34, disposed through a plate 35 attached to the lower end of the tool holder by means of screws 36. After the tool has been accurately adjusted to place its cutting edge properly relative to the work, it is locked in position by means of screws 37 engaging the sides thereof through the holder.

These screws are mounted in the head of the tool holder for engaging the side surface of the tool to wedge the same laterally within the slot 33. The tool is of elongated shape and contains an insert 38 of tungsten carbide at its upper or cutting end, which insert provides the cutting edge. This type of tool including tungsten carbide at its cutting end makes it possible to operate the machine at high speeds, as has been heretofore related, and the chips are therefore rapidly formed.

The chip control element includes a shank 39 which is attached to the tool holder and has a hollow head 40 which is disposed above the cutting point of the tool for housing and partially closing in the region at which the chips are cut from the work, the work in this instance being indicated at 41. The concavity in the head is open at the forward end and the side adjacent the work. Its wall surface 42 opposite to the upper side is curved starting from the rear edge 43 of the upper end of the tool and extends upwardly continuing as the inner surface of the overhanging wall 44 for the concavity. This curved surface is positioned for direct contact by the cuttings or chips immediately after they leave the cutting edge of the tool, engagement against the curved surface curling the chips and causing breaking thereof at frequent intervals.

The degree of curvature of this wall is arbitrary, as shown by Figures 2 and 4, depending on the hardness of the metal and the thickness of the cut. The ductile metals must be curved very abruptly to cause breakage while the brittle metals can be curved to spiral in a relatively large radius and will break often. In the event that the chips are not broken by the curling as they engage the curved wall, they engage a rear wall surface 45 of the cavity whereupon they are positively broken in view of the fact that the rotation of the spirally laid chip, caused by the curling action, is hindered and the chip is consequently twisted off.

The tool including the tungsten carbide tip has its upper surface 46 inclined rearwardly from the cutting point both toward the curved surface and toward the back wall of the cavity which produces a depression or pocket 47 which in combination with the general enclosure provides a region which is capable of filling up with coolant as supplied from a pipe 48 and providing a pool in which the chips are partially immersed.

Chips or cuttings 48 of varying length and radius of curl are disclosed in Figures 5 and 6. It will be understood that the particular cross section and length of the chips are governed by the quality of the material being cut, the thickness of the cut, and the arrangement of the curved surfaces. The principal idea is to insure positive breaking of the chips and to partially enclose or overhang the region into which they are discharged for preventing any possible damage due to flying chips.

Figures 7 to 10 illustrate a modified form of chip control element and tool holder attachment means in that a chip control element 50 is fastened directly to the tool holder and is of greatly simplified construction. The tool holder is of the same construction as that disclosed in the previous form. However it is clamped in position within a tool block 51 which is mounted on the tool slide 52 by insertion in a slot of the tool block and a clamping action is exerted thereon by means of screws 53. The chip control element in this case is fastened on the upper surface of the head end of the tool holder by means of a pair of screws 54.

The chip control element 50 is in the form of a plate having a notch or slot 55 cut on a curve in its forward edge. This form is of particular utility in cases of finishing cuts or light turning. It accomplishes the breaking and diverting of the chips in the same manner as the preceding form although its curved surface 56 does not form a contiguous surface with the surface of the tool back of the cutting edge. The element 50 provides the surface 56 in position overhanging the cutting edge of the tool whereby the chips or cuttings will contact the same as they come from the work.

In Figures 11 to 13 inclusive, a form of chip control element, designed primarily for diverting purposes, is disclosed. This form is used for cutting brittle metals, such as brass, cast iron, etc., the cutting of which metals because of their composition produces chips which break naturally into small sections, as opposed to the long flexible strips which are conventionally taken from the ductile metals.

The tool arrangement and attachment and the mounting of the control element is considerably varied from that disclosed in the other forms. The tool 57 is attached directly to the clamping block 58 of the tool slide 59 being inserted through a slot 60 therein in a horizontal plane. The chip control element 61 is mounted on top of the tool and is clamped therewith to the block by means of clamping screws 62. The chip control element includes a groove 63 in its bottom surface into which the tool fits for interlocking these parts together against lateral displacement.

In this type of chip control element, the principal function is to divert the stream of chips in the direction desired and to prevent rapid discharge of chips from the work. The tool in this case has its point extending out beyond the deflecting surface 64 formed in the forward end of the control element. The surface 64 is interposed for diverting the chips and is disposed directly in the path in which they move when cut from the work.

The tool 57 as in all the tools disclosed, includes the tungsten carbide cutting tip for permitting rapid operation. The deflecting surface 64 is curved transversely relative to the cutting tip of the tool and is inclined vertically downwardly over the work. An overhanging wall 65 is also provided for preventing upward movement of the loose chips.

In the form of device shown in Figures 14 to 18 inclusive, the chip control element is designed for use on the large type of lathe where extremely heavy cuts are made. In this case, the control element 66 is placed alongside of the tool 67 and includes a casing 68 formed integrally with its forward end, this casing including a side wall providing a curved interior surface 69 and a rear wall providing an abutment and surface 70. The surface back of the tool cutting edge and the curved surface of the rear wall of the control element are contiguous. The cutting edge 71 of the tool in this case is slightly at an angle relative to the length of the tool and as the thick chips or cuttings 72 come from the work, they engage the curved rear wall 69 which is also inclined relative to the length of the tool so as to direct the chips toward the rear wall.

The control element 66 and the tool 67 may be formed to include a tongue and groove connection 73 along their length for fitting the same snugly together and constituting the parts a unit whereby vibration and springing of the tool are lessened. The back wall of the casing of the control element extends over the tool as at 74 for further bracing action between the parts. As illustrated in Figures 17 and 18, this form of device may be provided with a removable shoe 75 for changing the curvature of the deflecting and breaking surface and for replacement when the curved surface becomes worn, this shoe being conveniently attached in position by means of a bolt 76 having its head countersunk in the shoe and a nut 77 on the rear side of the control element.

The provision of the removable shoes, which include the curved chip breaking surfaces, enables the manufacturer to construct that portion of the chip control element, which is contacted by the chips, of exceptionally hard metal, whereas, the remainder of the device may be a cast product without regard to the wearing qualities of the surfaces thereof.

In some forms of the device illustrated (see Figures 3 and 16) the wall which is curved for the purpose of breaking the chips, is inclined relative to the cutting edge of the tool, that is to say, the wall regarded transversely is not parallel with the cutting edge of the tool. The purpose of this inclination of the wall is to twist the chip as it comes off the tool, the twisting in combination with the curling, additionally assuring breakage of the chip. A chip which has been formed by engagement with the type of device, including an inclined wall, illustrated in Figures 14 to 18 inclusive, is shown in Figure 19.

In the type of device illustrated in Figures 14 to 18 inclusive of the drawings, a forward wall is included as well as an inner wall 70 this forward wall being indicated at 78. When the cutting edge of the tool and the transverse extent of the curved wall are non-parallel, the chips have a tendency to work laterally from the curved surface, in either direction, and it is necessary for this reason to house in the forward end of the device as well as the inner end.

Having described our invention, we claim:

1. A chip control device in combination with a cutting tool, comprising, an element mounted relative to the tool, said element having a curved surface extending from the cutting tip of the tool for spirally curling the chip and controlling the cross sectional size thereof, said element including a wall overhanging the curved surface against which the chip is fed, and means for breaking the chip from the work when the spirally curled chip is of a predetermined length.

2. A chip controlling apparatus, comprising, a cutting tool, means for supporting said cutting tool, a chip control element mounted relative to the cutting tool, said chip control element having a cavity formed therein into which the chip is fed, said cavity having a wall of a curvature suitable for curling the chip into small cross section and open at one side for discharge of the chips, said tool related to the cavity for providing a depression in the path of movement of the chips, and means for feeding coolant into the depression whereby the chips are initially moved into a pool of coolant.

3. A chip control device in combination with a cutting tool, compirsing, an element mounted relative to the tool, said element including a curved surface extending from the cutting tip of the tool for curling the chip into a spiral and a wall overhanging the portion of said element into which the chip is fed.

4. A chip controlling apparatus, comprising, a cuttting tool, means for supporting said cutting tool, a chip control element mounted relative to the cutting tool, said chip control element having a cavity formed therein into which the chips are fed, said cavity open at one side for discharge of the chips, said tool related to the cavity for providing a depression in the path of movement of the chips, and means for supplying coolant to the depression whereby the chips are initially moved into a pool of coolant.

5. A chip controlling apparatus, in combination with a tungsten carbide cutting tool, comprising, an element having a surface related to the cutting edge of the tool for contact by the chip as it is cut from the work, said surface contoured for curling the cutting sufficiently abruptly for breaking the cutting into small lengths, said element overhanging the region of cutting formation for preventing uncontrolled movement of the cutting as it is rapidly formed in high speed machine operation.

6. In a cutting apparatus of the class described, a cutting tool, a support for said cutting tool, an element mounted over the tool, said element including a chip breaking surface leading away from the cutting edge of the tool and housing the region adjacent the cutting edge of the tool for receiving the chips and preventing undue movement thereof as removed from the work in high speed operation.

7. In a cutting apparatus of the class described, a cutting tool, a support for said cutting tool, an element mounted over the tool and housing the region adjacent the cutting point of the tool for receiving the chips and preventing undue movement thereof as removed from the work in high speed operation, said tool and element related for forming a depression in the path of movement of the chips and means for supplying coolant to said depression.

8. In a metal cutting apparatus, a tool, an element mounted adjacent said tool and providing a casing overhanging the cutting edge of the tool and providing abutments engaged by the cuttings as they are removed from the work for breaking said cuttings into relatively short lengths.

9. In a metal cutting apparatus, a cutting tool, an element mounted adjacent the tool, said element including a wall having a curved surface extending from the cutting edge of the tool and disposed for receiving the chips as they are removed from the work, said surface inclined laterally away from the cutting edge for twisting the chips as they are curled by contact with the curved extent of the surface.

10. In a device of the class described, a cutting tool, a chip control element mounted adjacent said cutting tool and including a wall at its end adjacent the cutting edge of the tool, said wall providing an interior surface curved from the cutting edge of the tool in the path of movement of the chips as they are removed from the tool, removable shoes having varying curvatures and adapted to be secured on the interior surface of the chip control element for changing the curvature of the curved surface, and means for fastening a selected shoe in place.

11. In a device of the class described, a cutting tool, an element mounted adjacent the tool providing an overhanging chip receiving cavity enclosure and a recess for receiving coolant, and means for supplying coolant to said cavity and said recess.

12. In a device of the class described, a cutting tool, a chip control element mounted relative to said cutting tool, said element having a chip breaking surface curving from the cutting edge of the tool and inclined transversely to the curve to incline the same relative to the cutting edge of the tool, whereby the chips as they leave the cutting edge of the tool engage the curve surface at an angle and are curled and twisted concurrently.

13. In a device of the class described, a cutting tool, means for supporting said tool, a chip control device mounted relative to said tool, said device having a curved surface extended from the cutting point of the tool for causing spiral curling of the chips, and a limit wall abutted by the spirally curled chips when the spiral formations have reached a predetermined length, said wall preventing further rotative and longitudinal movement of the spirally curled chips and thereby causing the chips to break loose from the work to the desired length in the event that the curling has not been effective for previously breaking the chips.

14. In a machine of the class described, a cutting tool, means for supporting said tool, a chip control device mounted relative to said tool and having a curved chip deflecting surface disposed upwardly from the cutting edge of the tool.

In witness whereof, we hereunto subscribe our names.

ALBERT E. ROBINSON.
CHARLES E. BLACK.